United States Patent Office 3,632,576
Patented Jan. 4, 1972

3,632,576
STEROID BUTENOLIDES
Hans-Gunter Lehmann, Berlin, Germany, assignor to Schering AG, Berlin and Bergkamen, Germany
No Drawing. Filed Mar. 11, 1968, Ser. No. 711,847
Int. Cl. C07c 173/00
U.S. Cl. 260—239.57      42 Claims

ABSTRACT OF THE DISCLOSURE

A process for making steroid butenolides of the general formula

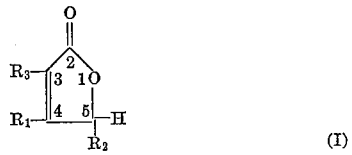
(I)

wherein (a) $R_1$ is a steroid residue and $R_2$ is hydrogen or (b) $R_1$ and $R_2$ together with the adjoining carbon atoms 4 and 5 of the butenolide ring are a steroid residue, and wherein $R_3$ is hydrogen or a lower alkyl group, in which process.

α-Halogenoacylates of primary or secondary steroid α-ketols are treated with triphenylphosphine or trialkylphosphite to obtain α-ketolacylates of the general formula

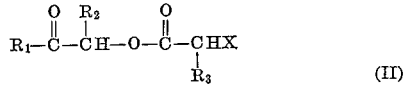
(II)

wherein $R_1$ and $R_2$ have the meaning given above at (a) or wherein $R_1$ and $R_2$ together with the

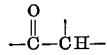

group form a steroid residue and wherein $R_3$ has the meaning given above, and wherein X is

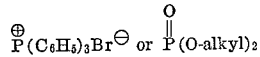

The α-ketolacylates are then reacted with a base in a solvent that is inert towards the components of the reaction. An example of the ketolacylate is triphenyl-(3β-benzoyloxy-20-oxo-Δ⁵-pregnene - 21-yl-oxycarbonylmethyl)-phosphonium bromide.

The products of the invention are valuable as intermediates to form carda-enolides such as digitoxigenone.

BACKGROUND OF THE INVENTION

Steroid butenolides are of great importance in pharmacology because of the beneficial action in illnesses of the heart of some of the members of this family. The synthesis of these compounds is therefore of prime significance. Several processes have already been proposed which basically all amount to a course of reaction wherein at first an acid residue is introduced into the keto-group of a primary or secondary steroid-α-ketol by means of a carbon-to-carbon bond, whereupon subsequently the thus obtained compounds are converted to butenolides by closure of the ring. However, none of these reactions has found practical use since the yield is poor.

SUMMARY OF THE INVENTION

It is therefore an object of the present invention to provide for an economically practical and technical useful synthesis of steroid butenolides.

More specifically, it is an object of the invention to provide for a ring closing reaction involving steroid ketols in order to form the butenolides.

The invention is based on the general concept that this closing of the ring can be effected easily by starting from α-ketols which through a hydroxyl group are predestined to facilitate the ring formation.

It was unexpected that steroid butenolides could be formed by the Wittig or Horner method, since in this type of reaction a bicyclic formation must occur. For this purpose it is necessary that the interreacting phosphorus and oxygen atoms occupy a very specific spatial relationship, for which reason the forming of a bicyclic arrangement is normally subject to substantial difficulties.

Specifically, the present invention relates to a process of making steroid butenolides of the general formula

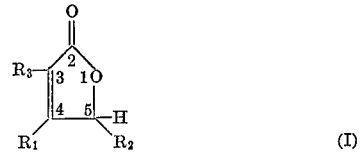
(I)

wherein (a) $R_1$ is a steroid residue and $R_2$ is hydrogen or (b) $R_1$ and $R_2$ together with the adjoining carbon atoms 4 and 5 of the butenolide ring are a steroid residue, and wherein $R_3$ is hydrogen or a lower alkyl group, which process is as follows:

α-Halogenoacylates of primary or secondary steroid α-ketols are treated with triphenylphosphine or trialkylphosphite to obtain α-ketolacylates of the general formula

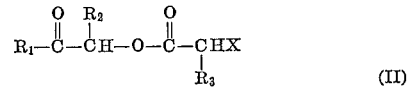
(II)

wherein $R_1$ and $R_2$ have the meaning given above at (a) or wherein $R_1$ and $R_2$ together with the

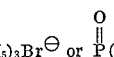

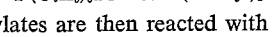

group form a steroid residue and wherein $R_3$ has the meaning given above, and wherein X is $$\overset{\oplus}{P}(C_6H_5)_3Br^{\ominus} \text{ or } \overset{O}{\overset{\|}{P}}(OAlkyl)_2$$

The α-ketolacylates are then reacted with a base in a solvent that is inert towards the components of the reaction. An example of the ketoleacylate is triphenyl-(3β-benzoyloxy-20-oxo-Δ⁵-pregnene - 21 - yl - oxycarbonylmethyl)-phosphonium bromide.

The products of the invention are valuable as intermediates to form carda-enolides such as digitoxigenone.

The invention also embraces the acylates used in the invention and defined above and certain novel buteneolides produced by the process of the invention.

DESCRIPTION OF THE PREFERRED EMBODIMENTS

As has already been pointed out, the synthesis of the invention of steroid buteneolides is of importance because of the medical application of the buteneolides as heart drugs. The immediate products of the process of the invention are in particular useful as intermediate products from which the final heart drugs can be made. For instance, starting from the 3-oxo-4,14,20(22)cardatrieneolide, the making of which will be described below in Example XXII, it is possible to obtain the well-known digitoxigenone drug by hydrogenation of the Δ⁴ and hydration of the Δ¹⁴ double bonds.

The steroid residue which is used in the acylates and appears also in the final product is preferably a residue which has the same substituents as the naturally occurring heart drugs or is a residue which includes, for instance, double bonds, alkyl, alkoxy, acyloxy or keto groups. The term "alkyl" in this connection preferably refers to lower alkyl.

The steroid residues are not limited to those of the cholestan or estrane series but may also be other steroids, provided that they have a primary or secondary α-ketol structure. For example, α-ketols in the 1,2-; 3,4-; 6,7-; 9,11- or 15,16-position are equally suited for the reaction. Particular reference is made at this point to the reactions described in Examples XXIII and XXIV below.

Suitable bases for the closing of the ring to form the butenolides are, for instance, the following: alkali metal hydrides, such as sodium hydride; alkali metal amides, such as sodium amide; alkali metal hydroxides, such as sodium hydroxide; alkali metal carbonates, such as potassium carbonate; alkali metal hydrogen carbonates, such as sodium bicarbonate; triethylamine, etc.

Examples of inert solvents for use with strong bases, such as the alkali metal hydrides, -amides and -hydroxides, are, for instance, the following: dimethylsulfoxide, dimethylformamide, dimethylacetamide, N-methylpyrrolidone, hexamethylphosphoric acid triamide. If weaker bases are used, it is possible, in addition to the listed solvents, also to use the following: tetrahydrofuran, diethylether, acetone, or tert. butanol. The reaction for closing the ring can also be carried out with a weak base in the presence of a primary alcohol, however in this case the yield is no longer very good.

The ring closing reaction generally proceeds with optimum yield at temperatures between about 40 and 130° C. At higher temperatures, side reactions may occur.

The particular phosphines and phosphides and the α-ketoleacylates obtained therewith which later form the principal reaction medium will now be discussed.

THE TRIPHENYLPHOSPHONIUMBROMIDES

The triphenylphosphoniumbromides which come under the above-given Formula II preferably are made by acidifying primary or secondary steroid α-ketols with α-halogenocarboxylic acids followed by exchange of the halogen atom against a phosphonium salt residue. The general course of this reaction is, for instance, as follows:

10 mmol of an α-hydroxy-β-keto-steroid are taken up with 50 ml. absolute dioxane and are reacted with 1.2 ml. (15 mmol) pyridine. 1.1 ml. (12 mmol) of bromoacetylbromide dissolved in 25 ml. absolute ether are then added dropwise in the course of one hour. The mixture is stirred for about 15 hours at room temperature. It is then diluted with ether, washed three times with water, followed by drying of the ether phase and extraction of the solvent in vacuo and recrystallization or reprecipitation of the ester. The yield is about 90%.

Other halogen derivatives can be made by analogous procedures.

10 mmol of the thus obtained ester are then stirred for 48 hours at room temperature with 3.2 g. (12 mmol) triphenylphosphine in 200 ml. nitromethane. This is followed by concentration in vacuo and subsequent precipitation of the phosphonium salt in absolute ether. The yield is about 90%.

The following examples illustrate the making of specific triphenylphosphoniumbromides without any intention of limitation:

Example A 2.43 g. 21-bromacetoxy-16α-methyl-4-pregnene-3,20-dione were mixed with 1.55 g. triphenylphosphine in 50 ml. nitromethane. The mixture, after initial stirring, was then allowed to stand for 5 days at room temperature. About 1 liter of ether was then added, whereupon the precipitate was removed by suction, washed again with ether, and dried. There was obtained 92.5% of the theoretical value of triphenyl - (3,20-dioxo-16α-methyl-4-pregnene-21-yl-oxycarbonylmethyl)-phosphoniumbromide having a melting-point between 122 and 125° C. (upon decomposition).

Example B 4.5 g. 21-bromacetoxy-4,14-pregnadiene-3-one were treated with 3.2 g. triphenylphosphine in 40 ml. nitromethane for 3 days at room temperature. About 2 liters of ether were added, whereupon the precipitate was removed by suction, washed with ether and dried. There was obtained 91% of the theoretical value of triphenyl-(3,20 - dioxo - 4,14-pregnadiene-21-yl-oxycarbonylmethyl)-phosphoniumbromide having a melting-point of 134° C. (upon decomposition).

Example C 2.34 g. 17-hydroxy - 21 - bromacetoxy-4-pregnene-3,20-dione with 1.6 g. triphenylphosphine in 50 ml. nitromethane were allowed to stand, after initial stirring, for 48 hours at room temperature. About 1 liter ether was then added and the precipitate was filtered off, washed again with ether, and dried. There was obtained 93% yield of triphenyl-(17α-hydroxy - 3,20 - dioxo-4-pregnene-21-yl-oxycarbonylmethyl) - phosphoniumbromide. This compound had a melting-point between 149 and 151° C. (decomposition).

In the same manner, there were obtained the following triphenylphosphoniumbromides:

triphenyl-(3β-benzoyloxy-20-oxo-Δ⁵-pregnene-21-yl-oxycarbonylmethyl)-phosphoniumbromide, M.P. 130° C. (decomposition).

triphenyl-(3,20-dioxo-5β-pregnane-21-yl-oxycarbonylmethyl)-phosphoniumbromide, M.P. 115.5–119° C. (decomposition).

triphenyl-(3,20-dioxo-Δ⁴-pregnene-21-yl-oxycarbonylmethyl)-phosphoniumbromide, M.P. 116–121° C. (decomposition).

triphenyl-(11β-hydroxy-3,20-dioxo-Δ⁴-pregnene-21-yl-oxycarbonylmethyl)-phosphoniumbromide, decomposition point 144° C.

triphenyl-[3,20-dioxo-Δ⁴-pregnene-21-yl-oxycarbonylethyl-(1')]-phosphoniumbromide, M.P. 110° C. (decomposition).

triphenyl-(14α-hydroxy-3,20-dioxo-Δ⁴-pregnene-21-yl-oxycarbonylmethyl)-phosphoniumbromide, M.P. 140–146° C. (decomposition).

triphenyl-(17α-hydroxy-3,20-dioxo-Δ¹,⁴-pregnadiene-21-yl-oxycarbonylmethyl)-phosphoniumbromide, M.P. 150–152° C. (decomposition).

triphenyl-(11β,17α-dihydroxy-3,20-dioxo-Δ⁴-pregnene-21-yl-oxycarbonylmethyl)-phosphoniumbromide, M.P. 157–159° C. (decomposition).

triphenyl-(17α-hydroxy-3,11,20-trioxo-Δ¹,⁴-pregnadiene-21-yl-oxycarbonylmethyl)-phosphoniumbromide, M.P. 149.5–151° C.

triphenyl-(14α,17α-dihydroxy-3,20-dioxo-Δ⁴-pregnene-21-yl-oxycarbonylmethyl)-phosphoniumbromide, M.P. 154–156° C.

triphenyl-(3-oxo-5α-cholestan-2α-yl-oxycarbonylmethyl)-phosphoniumbromide.

triphenyl-(3-methoxy-16-oxo-Δ¹,³,⁵⁽¹⁰⁾-estratriene-17β-yl-oxycarbonylmethyl)-phosphoniumbromide, M.P. 121–123° C.

THE DIALKYLPHOSPHONATES

The dialkylphosphonates coming under the general Formula II are made from halogenoacylates of primary or secondary steroid-α-ketols by exchanging the halogen atom for a dialkylphosphonate residue. The general course of the reaction is, for instance, as follows:

2 mmol of the halogeno-acetate of a α-hydroxy-ketosteroid are stirred at room temperature with 5 ml. trialkylphosphite. If desired, an inert solvent, such as dimethylformamide or ethanol or methanol, may be added. The reaction is complete after 2 to 12 days, which can be established by a thin layer chromatogram. The reaction mixture is then concentrated in vacuo and the residue is recrystallized or reprecipitated from diisopropylether. The yield is about 90%.

The following examples illustrate the making of the steroid-substituted dialkylphosphonates employed in the invention, without any intention of limitation:

Example D

A mixture of 200 mg. of 21-bromoacetoxy-4-pregnene-3,20-dione and 1 ml. trimethylphosphite was stirred for 6 days at room temperature. The excess phosphite was removed by distillation in vacuo and the oily residue was triturated three times with diisopropylether and the solid residue was washed with diisopropylether. There was thus obtained 170 mg. (3,20-dioxo-4-pregnene-21-yl-oxycarbonyl)-methanephosphonic-acid-dimethylester having a melting-point between 78 and 88° C. After recrystallization from diisopropylether, the melting-point was between 78 and 79° C.

Example E 2 g. 21-bromacetoxy-4-pregnene-3,20-dione were stirred for 5 days, at room temperature, with 9 ml. triethylphosphite. The mixture was concentrated in vacuo and the oily residue was triturated first with hexane and subsequently with diisopropylether. It was then cooled to —35° C. and after a little while, the crystals were removed by suction. There was obtained 1.6 g. (3,20-dioxo-4-pregnene-21-yl-oxycarbonyl)-methanephosphonic - acid - diethylester having a melting-point between 61 and 64° C.

Example F 3 g. 21-bromacetoxy-5β-pregnane - 3,20 - dione were stirred with 11 ml. triethylphosphite for 5 days at room temperature. The mixture was then concentrated in vacuo, triturated with diisopropylether, and cooled to —35° C. The crystals were thereupon removed by suction, washed with diisopropylether and dried. There was obtained (3,20-dioxo-5β-pregnane-21-yl-oxycarbonyl) - methanephosphonic-acid-diethylester having a melting-point between 90 and 92° C.

In the same manner the following dialkylphosphonates were made:

(17 - hydroxy - 3,20 - dioxo - Δ$^4$ - pregnene - 21 - yl - oxycarbonyl) - methanephosphonic-acid-diethylester, M.P. 177.5–180.5° C.

(14,17 - dihydroxy - 3,20 - Δ$^4$ - pregnene - 21 - yl - oxycarbonyl) - methanephosphonic - acid - diethylester, M.P. 173–174° C.

The following Examples I–XXIV illustrate, without any intention of limitation, the making of the steroid-butenolides by means of the just-described phosphoniumbromides.

CARDA-ENOLIDES MADE WITH PHOSPHONIUMBROMIDES

Example I 58 mg. of a 50% strength sodium hydride suspension were dissolved in 5 ml dimethylsulfoxide in a nitrogen atmosphere at 100° C. 820 mg. triphenyl-(3β-benzoyloxy-20 - oxo - Δ$^5$ - pregnene-21-yl-oxycarbonylmethyl)-phosphoniumbromide (M.P. under decomposition: 130° C.) dissolved in 15 ml. dimethylsulfoxide were added dropwise upon stirring during a period of 2 hours to the above solution of sodium hydride and were subjected to stirring for another 4 hours in a nitrogen atmosphere at 100° C. An acidified common salt solution was then added and the mixture was filtered and the residue washed with water and taken up in ether, whereupon the ether phase was again washed with water and dried. The solvent was then distilled off. After purification over silica gel, there was obtained 400 mg. (69% of the theoretical value) of 3β-benzoyloxy-Δ$^{5,20(22)}$-14α-cardadieneolide, which had a melting-point between 232 and 234° C.

Example II

A solution of 3.4 g. triphenyl-(3,20-dioxo-16α-methyl-Δ$^4$ - pregnene - 21 - yl-oxycarbonylmethyl)-phosphoniumbromide (melting-point under decomposition 122–125° C.) in 45 ml. dimethylsulfoxide were added to a solution of 350 mg. of a sodium hydride-oil suspension of a 50% concentration in 15 ml dimethylsulfoxide. The sodium hydride suspension was prepared under a nitrogen atmosphere. The addition of the phosphoniumbromide solution was effected dropwise at 100° C. during a period from 2 to 3 hours upon stirring. After the addition was complete, stirring was continued at 100° C. for another 4 hours. The solution was then cooled and poured into an acidified common salt solution which then was filtered, whereupon the precipitate was washed with water and dried. The residue was taken up with acidified aluminum oxide and was purified chromatographically. After recrystallization from ethyl acetate, there was obtained a 68% yield of 3-oxo - 16α - methyl - Δ$^{4,20(22)}$ - 14α - cardadieneolide, M.P. 215.5–216.5° C.

Example III 5 ml. dimethylsulfoxide was reacted in a nitrogen atmosphere with 116 mg. of a 50% strength sodium hydride-oil suspension and subjected to heating to about 100° C. A solution of 1.43 g, triphenyl-(3,20-dioxo-5β-pregnane - 21 - yl - oxycarbonylmethyl) - phosphoniumbromide (M.P. 115.5–119° C. upon decomposition) in 20 ml. dimethylsulfoxide was added dropwise upon stirring during the course of 2 to 3 hours to the sodium hydride suspension and after completion of the addition was allowed to stand for another 4 hours at about 100° C. The mixture was then cooled and poured into an acidified common salt solution. Thereafter, it was filtered and washed with water. The residue was dried and subjected to chromatographical purification over silica gel. After recrystallization from ethyl acetate there was obtained 480 mg. (67.4% of the theoretical yield) of 3-oxo-Δ$^{20(22)}$-14α-cardeneolide, M.P. 233–234.5° C.

Example IV 20 ml. dimethylsulfoxide was reacted in a nitrogen atmosphere with 417 mg. of a 50% strength sodium hydride-oil suspension and was heated to 100° C. A solution of 5.8 g triphenyl-(3,20-dioxo-Δ$^4$-pregnene-21-yl-oxycarbonylmethyl) - phosphoniumbromide (M.P. 116–121° C. upon decomposition) in 80 ml. dimethylsulfoxide was then added in the course of 2–3 hours and the mixture was stirred, after completion of the addition, for another 4 hours at 100° C. It was then cooled, poured into an acidified common salt solution and filtered. The precipitate was washed with water, dried, and subjected to chromatography over acidic aluminum oxide. After recrystallization from ethyl acetate, a 51% yield was obtained of 3-oxo-Δ$^{4,20(22)}$-14α-cardadieneolide, M.P. 234–235.5° C.

Example V

The same process steps were carried out as in Example III, except that the base employed was a suspension of 100 mg. sodium hydroxide powder in 5 ml. dimethylsulfoxide. There was obtained a 58% yield of 3-oxo-14α-card-20(22)-eneolide.

Example VI

The same process steps were carried out as in Example III, using as base, however, 270 mg. potassium-tert.-butylate in 5 ml. dimethylsulfoxide. After chromatography over silica gel, there was obtained a 53% yield of 3-oxo-14α-card-20(22)-eneolide in addition to 17% 5β-pregnane-21-ol-3,20-dione.

Example VII 116 mg. of a 50% strength sodium hydride-mineral oil suspension was dissolved in a nitrogen atmosphere at 100° C. in 5 ml. dimethylsulfoxide. A solution of 1.6 g. triphenyl - (11β - hydroxy - 3,20-dioxo-4-pregnene-21-yl-oxycarbonylmethyl) - phosphoniumbromide (decomposition point 144° C.) in 15 ml. dimethylsulfoxide was added dropwise within a period of 2 hours to the sodium hydride solution and stirring was then continued for another 4 hours at 100° C. After cooling to room temperature, the solution was stirred into an acidified common salt solution, was filtered and washed with water, then dried and purified chromatographically over silica gel. There was obtained 61% yield of 11β1hydroxy-3-oxo-14α - carda - 4,20(22)-dieneolide, M.P. 237–239° C.

Example VIII

Triphenyl - [3,20 - dioxo - 4 - pregnene-21-yl-oxy-carbonylethyl (1')]-phosphoniumbromide (M.P. 110° C., under decomposition) was processed through the same steps as were followed in Example III. After recrystallization from ethyl acetate, a 51% yield was obtained of 3-oxo - 22 - methyl - 14α - carda - 4,20(22)-dieneolide, M.P. 237–239° C.

Example IX

Triphenyl - (14α - hydroxy - 3,20-dioxo-4-pregnene-21-yl-oxycarbonylmethyl)-phosphoniumbromide (M.P. 140–146° C.; decomposition) was processed through the same steps as were carried out in Example III. After chromatographic purification, a 59% yield of crude 14α-hydroxy-3-oxo-14α-carda-4,20(22)-dieneolide was obtained. This compound had a melting-point between 238 and 245° C. after recrystallization from acetone.

Example X 2.7 g. triphenyl - (17α - hydroxy-3,20-dioxo-1,4-pregnadiene - 21 - yl - oxycarbonylmethyl)-phosphoniumbromide (M.P. 150–152° C.; decomposition) was heated for 8 hours upon reflux in 7.5 ml. acetone with 670 mg. potassium carbonate (desiccated). The mixture was cooled, poured into acetic acid ice water saturated with common salt, and filtered. The residue was washed with water and taken up in ethyl acetate. The solution was then mixed with sodium sulfate and purified chromatographically over silica gel. A crude yield of 66% was obtained of 17α - hydroxy-3-oxo-14α-carda-1,4,20(22)-trieneolide, which had a melting-point between 281 and 282° C. after recrystallization from ethanol.

Example XI

The same process steps were followed as in Example X but starting from 3.64 g. triphenyl-(11β,17α-dihydroxy-3,20 - dioxo - pregn - 4 - ene-21-yl-oxycarbonylmethyl)-phosphoniumbromide (M.P. 157–159° C., decomposition) and 880 mg. potassium carbonate in 25 ml. acetone. A yield of 67% was obtained of 11β,17α-dihydroxy-3-oxo-14α - carda - 4,20(22) - dieneolide, which had a melting-point of 254–254.5° C. after recrystallization from ethanol.

Example XII

Analogous to Example X, 350 mg. triphenyl-17α-hydroxy - 3,20 - dioxo-pregn - 4 - ene-21-yl-oxycarbonylmethyl)-phosphoniumbromide (M.P. 148.5–151.5° C.) and 90 mg. potassium carbonate in 2 ml. acetone were processed and resulted in a 62% yield of 17α-hydroxy-3-oxo - 14α - carda - 4,20(22)-dieneolide, which had a melting-point of 267.5–270.5° C. after recrystallization from ethyl acetate.

Example XIII

Analogous to Example X, 3.82 g. triphenyl-(17α-hydroxy - 3,11,20 - trioxopregna - 1,4 - diene - 21 - yl-oxycarbonylmethyl) - phosphoniumbromide (M.P. 149.5–151° C.) and 930 mg. potassium carbonate in 10 ml. acetone gave a 69% yield of 17α-hydroxy-3,11-dioxo-14α - carda - 2,4,20(22)-trieneolide, which had a melting-point of 289–291° C. after recrystallization from chloroform.

Example XIV

Analogous to Example X, 680 mg. triphenyl-(14α,17α-dihydroxy - 3,20 - dioxo - pregn-4-ene-21-yl-oxycarbonyl-methyl)-phosphoniumbromide (M.P. 154–156° C.) and 165 mg. potassium carbonate in 1.8 ml. acetone gave a 68% yield of 14,17 - dihydroxy - 3 - oxo-14α-carda-4, 20(22) - dieneolide, which had a melting-point of 246–248° C. after recrystallization from acetone.

Example XV

Analogous to Example X, 50 mg. triphenyl-(14α,17α-dihydroxy - 3,20 - dioxo-pregn-4-ene-21-yl-oxycarbonylmethyl)-phosphonium bromide and 20 mg. sodiumhydrogencarbonate in 1 ml. acetone yielded, after 20 hours heating under reflux, 49% of 14,17-dihydroxy-3-oxo-14α-carda-4,20(22)-dieneolide, which had a melting-point of 246–248° C. after recrystallization from acetone.

Example XVI

Analogous to Example X, 50 mg. triphenyl-(14,17-dihydroxy - 3,20 - dioxo - pregn-4-ene-21-yl-oxycarbonylmethyl)-phosphoniumbromide and 20 mg. potassium carbonate in 1 ml. dimethylsulfoxide yielded, after 17 hours heating over a water bath maintained at 60–70° C., 74% of 14,17 - dihydroxy - 3 - oxo-14α - carda-4,20(22)-dieneolide, which was identical with the dieneolides obtained according to Examples XIV and XV.

Example XVII

Analogous to Example X, 50 mg. triphenyl-(14,17-dihydroxy - 3,20 - dioxo-pregn - 4 - ene-21-yl-oxycarbonylmethyl)-phosphoniumbromide and 20 mg. potassium carbonate in 1 ml. absolute ethanol yielded, after 7 hours heating upon reflux, 29% of 14,17-dihydroxy-3-oxo-14α-carda-4,20(22)-dieneolide.

Example XVIII

The same procedure was followed as in Example XVII but substituting for the ethanol 1 ml. tert. butanol (anhydrous) and heating for 7 hours to 80° C. There was obtained a 72% yield of 14,17 - dihydro - 3-oxo-14α-carda-4,20(22)-dieneolide.

Example XIX

Analogous to Example 10, 50 mg. triphenyl-(14,17-dihydroxy - 3,20 - dioxo - pregn-4-ene-21-yl-oxycarbonylmethyl)-phosphoniumbromide and 1 ml. triethylamine yielded, after 7 hours heating over a water bath, 50% of 14,17 - dihydroxy - 3 - oxo - 14α-carda-4,20(22)-dieneolide.

Example XX

Analogous to Example X, 50 mg. triphenyl-(14,17-dihydroxy - 3,20 - dioxo - pregn - 4 - ene - 21 - yl - oxycarbonylmethyl) - phosphoniumbromide anad 20 mg. potassium carbonate in 1 ml. abs. tetrahydrofuran yielded, after 17 hours heating upon reflux, 20% of 14,17-dihydroxy - 3 - oxo - 14α - carda - 4,20(22) - dieneolide.

Example XXI

Analogous to Example X, 50 mg. triphenyl-3,20-dioxo-5β - pregnane - 21 - yl - oxycarbonylmethyl) - phosphoniumbromide and 20 mg. potassium carbonate yielded, after 20 hours heating in acetone upon reflux, 28% of 3-oxo-5β,14α - card - 20(22) - eneolide, which had a melting-point of 234–235° C. after recrystallization from ethyl acetate.

Example XXII 12 ml. of absolute dimethylsulfoxide was reacted under nitrogen with 260 mg. of 50% strength sodium hydride suspension in mineral oil. A solution of triphenyl- (3,20-dioxo - 4,14 - pregnadiene - 21 - yl - oxycarbonylmethyl)-phosphoniumbromide in 24 ml. abs. dimethylsulfoxide was then added dropwise during a period of one hour at 100° C. to the sodium hydride mixture. After completion of the addition, the mixture was heated under nitrogen and stirring was continued at 100° C. for another 3 hours. The mixture was then permitted to cool and poured into an acidified common salt solution having a temperature of 0° C. The precipitate was filtered off and washed with water. The residue was then dried and chromatographically purified over silica gel. After recrystallization from ethyl acetate, a 47% yield was obtained of 3-oxo-4,14,20(22)-cardatrieneolide; M.P. 282–283° C.

Example XXIII 744 mg. of sodium hydride-oil suspension of a 55% strength was suspended in 20 ml. dimethylsulfoxide. Triphenyl - (3 - oxo - 5α - cholestan - 2α - yl - oxycarbonylmethyl)-phosphoniumbromide had been separately obtained from 5α-cholestan-2α-ol-3-one-acetate by saponification and subsequent reaction, as set forth above in the chapter on the phosphoniumbromides. A solution of 10 g. of the thus prepared phosphonium bromide in 140 ml. dimethylsulfoxide was then added to the sodium hydride mixture in the course of 3 hours. Stirring was continued for another 4 hours at 60° C., whereupon the mixture was poured into an acetic common salt solution. The oily residue was filtered off, and after washing with water was taken up in methylenechloride. The solution was then washed with a common salt solution, dried, and concentrated in vacuo. After chromatography over silica gel, there was obtained 1.1 g. of an oily 3-(carboxymethylene)-5α-cholestan-2α-ol-3β→2-lactone.

Example XXIV 630 mg. of a 50% sodium hydride suspension were dissolved in 25 ml. dimethylsulfoxide under nitrogen at 100° C. A solution of 7.44 mg. triphenyl-(3-methoxy-16-oxo - $\Delta^{1,3,5(10)}$ - estratriene - 17β - yl - oxycarbonylmethyl) - phosphoniumbromide (M.P. 121–123° C.) in 100 ml. dimethylsulfoxide was then added dropwise under stirring in the course of one hour to the sodium hydride solution. Stirring was continued at 100° C. in a nitrogen atmosphere for another 4 hours. The mixture was then permitted to cool, was poured into an acidified common salt solution, whereupon it was filtered, washed with water, and dried. The buteneolide was then purified by chromatography over silica gel and was recrystallized from ethyl acetate. A final product of 16 - carboxymethylene - estradiol - 3 - methylether - 16β→17 - lactone having a melting point of 231–234° C. was obtained.

The following Examples XXV to XXXII illustrate the making of steroid-butenolides by means of dialkylphosphonates.

CARDA-ENOLIDES MADE WITH DIALKYL PHOSPHONATES

Example XXV 255 mg. of (3,20 - dioxo - 5β - pregnane - 21 - yl-oxycarbonyl)-methanephosphonic acid-diethylester (M.P. 90–92° C.) was heated with 90 mg. potassium carbonate in 3 ml. abs. tert. butanol. The heating was carried out under nitrogen and upon reflux during a period of 2 hours. The mixture was then permitted to cool, was poured into acidified ice water, and was then subjected to stirring up to precipitation and the crude product was thereupon filtered off. After drying and recrystallization from ethyl acetate, there was obtained a 78% yield of 3-oxo-5β,14α-card-20(22)-enolide (M.P. 232–234° C.).

Example XXVI 260 mg. of (17 - hydroxy - 3,20 - dioxo - 4 - pregnane-21 - yl - oxycarbonyl) - methanephosphonic acid - diethylester (M.P. 177.5–180.5° C.) was heated upon reflux for 8 hours with 90 mg. potassium carbonate in 4 ml. acetone. After treatment and chromatographic purification over silica gel, a yield of 45% of 17-hydroxy-3-oxo-14α-carda-4,20(22)-dieneolide was obtained, which after recrystallization from ethyl acetate had a melting point of 266–268° C.

Example XXVII

The same process steps were carried out as in Example XXVI, except that abs. tert. butanol was used instead of acetone and heating was effected upon reflux for 2 hours. After chromatographic purification over silica gel and recrystallization from ethyl acetate, a yield of 51% of 17-hydroxy - 3 - oxo - 14α - carda - 4,20(22) - dieneolide with a melting point of 267–269° C. was obtained.

Example XXVIII

The same process steps were employed as in Example XXV but starting from 270 mg. (14,17 - dihydroxy - 3,20-dioxo - 4 - pregnene - 21 - yl - oxycarbonyl) - methanephosphonic acid-diethylester (M.P. 173–174° C.). After further treatment and chromatographic purification over silica gel and recrystallization from ethyl acetate, a yield of 54% of 14,17 - 3 - oxo - 14α - carda - 4,20(22)-dieneolide with a melting point of 251–253° C. was obtained.

Example XXIX

The same process was followed as in Example XXVIII, using, however, dimethylsulfoxide instead of tert. butanol as solvent and effecting the heating for 150 minutes to 70° C. in a nitrogen atmosphere. After further processing, chromatographic purification over silica gel and recrystallization from ethyl acetate, a 53% yield of 14,17-dihydroxy-3-oxo-14α-carda-4,20(22)-dieneolide was obtained which was identical with the dieneolide of Example XXVIII.

Example XXX 255 mg. of (3,20-dioxo-4-pregnene-21-yl-oxycarbonyl)-methanephosphonic acid-dimethylester (M.P. 78–790° C.) was heated for 2 hours in a nitrogen atmosphere to 100° C. with 90 mg. potassium carbonate and 3 ml. tert. butanol. The mixture was permitted to cool, poured into acidified ice water and stirred to precipitation. The crude product was filtered off and after drying and recrystallization from ethyl acetate, a 63% yield of 3-oxo-14α-carda-4,20(22)-dieneolide with a melting-point of 234–235.5° C. was obtained.

Example XXXI 255 mg. (3,20-dioxo-4-pregnene-21-yl-oxy-carbonyl)-methanephosphonic acid-diethylester (M.P. 61–64° C.) was used as starting material, and otherwise the process of Example XXX was followed. There was obtained a 58% yield of 3-oxo-14α-carda-4,20(22)-dieneolide, which was identical with the dieneolide obtained in Example XXX.

Example XXXII

The same steps were followed as in Example XXX, using, however, dimethylsulfoxide as solvent. After 6 hours heating in a nitrogen atmosphere to 100° C. and subsequent treatment and recrystallization from ethyl acetate, a yield of 65% of 3-oxo-14α-carda-4,20(22)-dieneolide was obtained, which was identical with the dieneolide obtained in the process of Example XXX.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. The process of making steroid butenolides of the formula

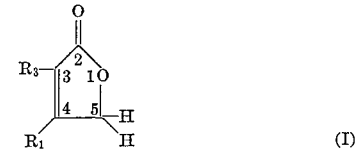

wherein $R_1$ is a steroid residue conected through the C-17 atom of the steroid molecule with the butenolide ring, and wherein $R_3$ is hydrogen or a lower alkyl group having 1 to 5 carbon atoms, said process comprising reacting an α-ketolacylate of the formula

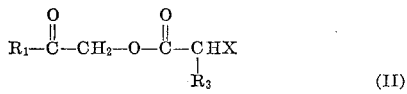

(II)

wherein $R_1$ has the same meaning as above and wherein $R_3$ is hydrogen or a lower alkyl group having from 1 to 3 carbon atoms, and wherein X is $$P^{\oplus}(C_6H_5)_3Br^{\ominus} \text{ or is } \overset{O}{\underset{\|}{P}}(OR)_2$$

R being methyl or ethyl, with a base in a solvent inert towards the components of the reaction.

2. The process of claim 1, wherein the steroid residue constituted by $R_1$ is

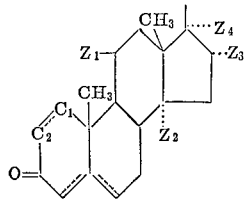

(III)

wherein

is a single or double carbon bond,

is a $\Delta^4$- or $\Delta^5$-double bond or represents 5β-hydrogen, $Z_1$, $Z_2$ and $Z_4$ are hydrogen or hydroxyl, and $Z_2$ may in addition also be a $\Delta^{14}$-double bond, and wherein $Z_3$ is hydrogen or methyl.

3. The process of claim 1, wherein the α-ketol-acylate is obtained by reacting an α-halogenoacylate of a primary steroid α-ketol with triphenyl-phosphine or trimethylphosphite or triethylphosphite.

4. The process of claim 1, wherein the base is an alkali metal hydride, alkali metal amide, alkali metal hydroxide, alkali metal carbonate, alkali metal bicarbonate or triethylamine.

5. The process of claim 4, wherein the base is a sodium hydride, sodium amide, sodium hydroxide, potassium carbonate, or sodium bicarbonate.

6. The process of claim 1, wherein the base is an alkali metal hydride, -amide, or -hydroxide and the solvent is dimethylsulfoxide, dimethylformamide, dimethyl-acetamide, N-methylpyrrolidone or hexamethylphosphoric acid triamide.

7. The process of claim 1, wherein the solvent is tetrahydrofurane, diethylether, acetone, or tertiary butanol.

8. The process of claim 1, wherein the reaction is carried out at a temperature between 40 and 130° C.

9. A carda-enolide having the formula

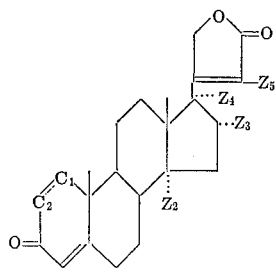

wherein

is a single or double carbon bond, $Z_2$ is hydroxyl or a $\Delta^{14}$ double bond, $Z_4$ is hydrogen or hydroxy and wherein $Z_3$ and $Z_5$ are hydrogen or methyl.

10. The compound of claim 9 which is 3-(carboxymethylene)-5α-cholestane-2α-ol-3β→2-lactone.

11. The compound of claim 9 which is 16-carboxymethylene-estradiol-3-methylether-16β→17-lactone.

12. The compound of claim 9 which is 11β-hydroxy-3-oxo-14α-carda-4,20(22)-dieneolide.

13. The compound of claim 9 which is 3-oxo-22-methyl-14α-carda-4,20(22)-dieneolide.

14. The compound of claim 9 which is 14α-hydroxy-3-oxo-14α-carda-4,20(22)-dieneolide.

15. The compound of claim 9 which is 17α-hydroxy-3-oxo-14α-carda-1,4,20(22)-trieneolide.

16. The compound of claim 9 which is 17α-hydroxy-3-oxo-14α-carda-4,20(22)-dieneolide.

17. The compound of claim 9 which is 14,17-dihydroxy-3-oxo-14α-carda-4,20(22)-dieneolide.

18. The compound of claim 9 which is 3-oxo-4,14,20(22-)-cardatrieneolide.

19. A cardenolide having the formula

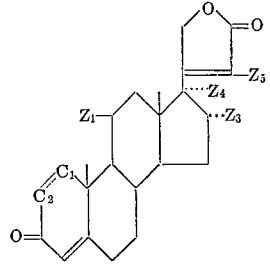

wherein

is a single or double bond, $Z_1$ is hydroxy or oxygen, $Z_4$ is hydrogen or hydroxy and wherein $Z_3$ and $Z_5$ are hydrogen or methyl.

20. The compound of claim 19 which is 11β,17α-dihydroxy-3-oxo-14α-carda-4,20(22)-dieneolide.

21. The compound of claim 19 which is 17α-hydroxy-3-,11-dioxo-14α-carda-1,4,20(22)-trieneolide.

22. An acylate of a primary steroid α-ketol of the formula

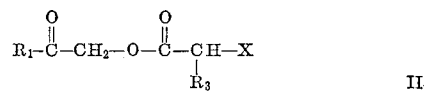

II wherein $R_1$ is a steroid residue of the androstane series, and wherein $R_3$ is hydrogen or methyl, and wherein X is

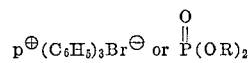

R being methyl or ethyl.

23. The compound of claim 22 which is triphenyl-(3β-benzoyloxy - 20-oxo-Δ⁵-pregnene-21-yl-oxycarbonylmethyl)-phosphoniumbromide.

24. The compound of claim 22 which is triphenyl(3,20-dioxo-16α-methyl-Δ⁴-pregnene-21-yl-oxycarbonylmethyl)-phosphoniumbromide.

25. The compound of claim 22 which is triphenyl(3,20-dioxo - 5β - pregnane - 21 - yloxycarbonylmethyl)-phosphoniumbromide.

26. The compound of claim 22 which is triphenyl(3,20-dioxo-Δ⁴-pregnene - 21-yloxycarbonylmethyl)-phosphoniumbromide.

27. The compound of claim 22 which is triphenyl-(11β-hydroxy - 3,20 - dioxo-Δ⁴-pregnene - 21-yloxycarbonylmethyl)-phosphoniumbromide.

28. The compound of claim 22 which is triphenyl[3,20-dioxo - Δ⁴-pregnene - 21 - yloxycarbonylethyl(1')]-phosphoniumbromide.

29. The compound of claim 22 which is triphenyl-(14α-hydroxy - 3,20-dioxo-Δ⁴-pregnene-21-yloxycarbonylmethyl)-phosphoniumbromide.

30. The compound of claim 22 which is triphenyl-(17α-hydroxy - 3,20 - dioxo-Δ$^{1,4}$-pregnadiene-21-yloxycarbonylmethyl)-phosphoniumbromide.

31. The compound of claim 22 which is triphenyl-(11β-17α - dihydroxy - 3,20-dioxo-Δ$^4$ - pregnene-21-yloxycarbonylmethyl)-phosphoniumbromide.

32. The compound of claim 22 which is triphenyl-(17α-hydroxy - 3,20 - dioxo - Δ$^4$-pregnene-21-yloxycarbonylmethyl)-phosphoniumbromide.

33. The compound of claim 22 which is triphenyl-(17α-hydroxy - 3,11,20 - trioxo-Δ$^{1,4}$-pregnadiene-21-yloxycarbonylmethyl)-phosphoniumbromide.

34. The compound of claim 22 which is triphenyl-(14α-17α - dihydroxy-3,20-dioxo-Δ$^4$-pregnene-21-yloxycarbonylmethyl)-phosphoniumbromide.

35. The compound of claim 22 which is triphenyl-(3,20-dioxo - Δ$^{4,14}$ - pregnadiene - 21 - yloxycarbonylmethyl)-phosphoniumbromide.

36. The compound of claim 22 which is triphenyl-(3-oxo - 5α - cholestan-2α-yloxycarbonylmethyl)-phosphoniumbromide.

37. The compound of claim 22 which is triphenyl-(3-methoxy - 16 - oxo-Δ$^{1,3,5(10)}$-estratriene-17β-yloxycarbonylmethyl)-phosphoniumbromide.

38. The compound of claim 22 which is (3,20-dioxo-5β - pregnane - 21 - yloxycarbonyl)-methanephosphonic acid diethylester.

39. The compound of claim 22 which is (17-hydroxy-3,20 - dioxo - Δ$^4$-pregnene - 21-yloxycarbonyl)-methanephosphonic acid diethylester.

40. The compound of claim 22 which is (14,17-dihydroxy - 3,20 - dioxo-Δ$^4$-pregnene - 21 - yloxycarbonyl)-methanephosphonic acid diethylester.

41. The compound of claim 22 which is (3,20-dioxo-Δ$^4$-pregnene - 21-yloxycarbonyl)-methanephosphonic acid dimethylester.

42. The compound of claim 22 which is (3,20-dioxo-Δ$^4$-pregnene - 21-yloxycarbonyl)-methanephosphonic acid diethylester.

References Cited
UNITED STATES PATENTS 3,194,804  7/1965  Baran _____ 260—239.57

FOREIGN PATENTS 909,201  10/1962  Great Britain _____ 260—239.57

ELBERT L. ROBERTS, Primary Examiner

U.S. Cl. X.R.

260—397.2, 397.4, 397.45, 397.47